(12) United States Patent
Kamata

(10) Patent No.: US 6,397,005 B1
(45) Date of Patent: May 28, 2002

(54) LENS-FITTED PHOTO FILM UNIT

(75) Inventor: Kazuo Kamata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 9 days.

(21) Appl. No.: 09/586,766

(22) Filed: Jun. 5, 2000

(30) Foreign Application Priority Data

Jun. 4, 1999 (JP) .......................................... 11-158554

(51) Int. Cl.[7] .............................................. G03B 17/02
(52) U.S. Cl. ............................ 396/6; 396/538; 396/539
(58) Field of Search .............................. 396/6, 538, 539

(56) References Cited

U.S. PATENT DOCUMENTS 4,896,178 A * 1/1990 Ohmura et al. ............. 396/176
5,649,236 A * 7/1997 Balling ........................... 396/6
5,854,946 A * 12/1998 Motomura et al. ............ 396/6

* cited by examiner

*Primary Examiner*—David M. Gray
*Assistant Examiner*—Rochelle Blackman
(74) *Attorney, Agent, or Firm*—Young & Thompson

(57) ABSTRACT

A lens-fitted photo film unit is preloaded with unexposed photo film. A main body has a cassette holder chamber and a roll holder chamber. The cassette holder chamber contains a cassette shell. The roll holder chamber contains a roll of the photo film drawn from the cassette shell. An exposure unit is secured to the main body between the cassette holder chamber and the roll holder chamber, for providing an exposure in the photo film. An electronic flash unit is secured to the main body, for illuminating a photographic field to be photographed. A battery supplies the flash unit with power, is disposed under the exposure unit, and has at least one portion disposed under the roll holder chamber.

14 Claims, 5 Drawing Sheets

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit in which an electronic flash unit is incorporated and of which a size is reduced.

2. Description Related to the Prior Art

A lens-fitted photo film unit is a simplest type of single-use camera preloaded with unexposed photo film. The lens-fitted photo film unit includes a main body, front cover and rear cover. The main body accommodates the photo film.

The front and rear covers cover the front and rear of the main body. There is an exposure unit secured to the center of the main body, and includes a mechanism for taking an exposure. A cassette holder chamber is formed in an end of the main body to contain a cassette shell of a photo film cassette. A roll holder chamber is formed in a remaining end of the main body to contain a roll of the photo film drawn from the cassette shell and wound in a roll form.

The lens-fitted photo film unit has various characteristics in a small size, simple structure and low cost. Among various types of the lens-fitted photo film unit, one includes an electronic flash unit. The flash unit is constituted by a printed circuit board, flash emitter, main capacitor and battery. The flash emitter includes a flash discharge tube. The battery supplies the printed circuit board with power. To obtain sufficiently high amount of flash light, the main capacitor has a relatively high capacitance, typically in consideration with photographic fields short of ambient light, for example scenes at night or indoor scenes.

Among the elements included in the flash unit, the main capacitor and battery have relatively great volumes to take large space. Capacitance of the main capacitor is correlated with the size of the main capacitor. The considerable sizes of the main capacitor and battery are inconsistent to an idea of reducing the size of the lens-fitted photo film unit.

To secure the flash unit to the lens-fitted photo film unit, the printed circuit board is disposed on a side of the exposure unit. The main capacitor is oriented to extend horizontally on an upper side of the roll holder chamber. The battery is oriented to extend horizontally under the exposure unit and printed circuit board. A distance between outer surfaces of the cassette holder chamber and roll holder chamber is predetermined equal to or more than a horizontal size of the battery to keep the battery contained between the cassette holder chamber and roll holder chamber.

This disposition can avoid an increase in the vertical size and thickness of the lens-fitted photo film unit. However, there occurs an increase in a size of the lens-fitted photo film unit in the horizontal direction or photo film advancing direction.

SUMMARY OF THE INVENTION

In view of the foregoing problems, an object of the present invention is to provide a lens-fitted photo film unit of which a horizontal size is reduced in a photo film advancing direction.

In order to achieve the above and other objects and advantages of this invention, a lens-fitted photo film unit preloaded with unexposed photo film includes a main body, having a cassette holder chamber and a roll holder chamber, the cassette holder chamber containing a cassette shell, the roll holder chamber containing a roll of the photo film drawn from the cassette shell. An exposure unit is secured to the main body between the cassette holder chamber and the roll holder chamber, for providing an exposure in the photo film. An electronic flash unit is secured to the main body, for illuminating a photographic field to be photographed. A battery supplies the flash unit with power, the battery being disposed under the exposure unit, and having at least one portion disposed under the roll holder chamber.

In a preferred embodiment, a lower edge of the roll holder chamber is disposed higher than a lower edge of the cassette holder chamber, and the battery extends horizontally in a lengthwise direction thereof.

The cassette holder chamber has a first outer wall, the roll holder chamber has a second outer wall, and a distance between the first and second outer walls is shorter than a size of the battery in a horizontal direction.

The battery has a cylindrical shape, and has a diameter smaller than a diameter of a UM-3 battery.

The battery is a UM-4 type.

The flash unit includes a flash emitter for applying flash light to the photographic field. A main capacitor stores charge for flash emitting operation of the flash emitter, the main capacitor being disposed above the roll holder chamber, and having capacitance of 15–50 $\mu$F.

The photo film has photo film speed of ISO 1600 or higher.

The roll holder chamber includes a lower wall for supporting the roll of the photo film. A lower opening is formed in substantially a middle of the lower wall. Furthermore, a lower lid closes the lower opening. A skirt projection portion is formed with a periphery of the lower opening to project downwards, disposed inside a periphery of the lower wall, and fitted on the lower lid. The battery is disposed at least partially under the lower wall and outside the skirt projection portion.

According to another aspect of the invention, a lens-fitted photo film unit preloaded with unexposed photo film includes a main body, having a cassette holder chamber and a roll holder chamber, the cassette holder chamber containing a cassette shell, the roll holder chamber containing a roll of the photo film drawn from the cassette shell. An exposure unit is secured to the main body between the cassette holder chamber and the roll holder chamber, for providing an exposure in the photo film. An electronic flash unit is secured to the main body, for illuminating a photographic field to be photographed. A battery is disposed under the exposure unit, for supplying the flash unit with power, the battery having a size equal to or less than substantially $\frac{2}{3}$ of a size of a UM-3 battery in a lengthwise direction thereof.

In a preferred embodiment, the flash unit includes a flash emitter for applying flash light to the photographic field. A main capacitor stores charge for flash emitting operation of the flash emitter, the main capacitor being disposed above the roll holder chamber, and having capacitance of 15–50 $\mu$F. The battery has a cylindrical shape, has a diameter substantially equal to a diameter of a UM-3 battery, and is disposed to extend between the cassette holder chamber and the roll holder chamber.

The size of the battery is equal to or more than substantially ½ of the size of the UM-3 battery in the lengthwise direction thereof.

The photo film has photo film speed of ISO 1600 or higher.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
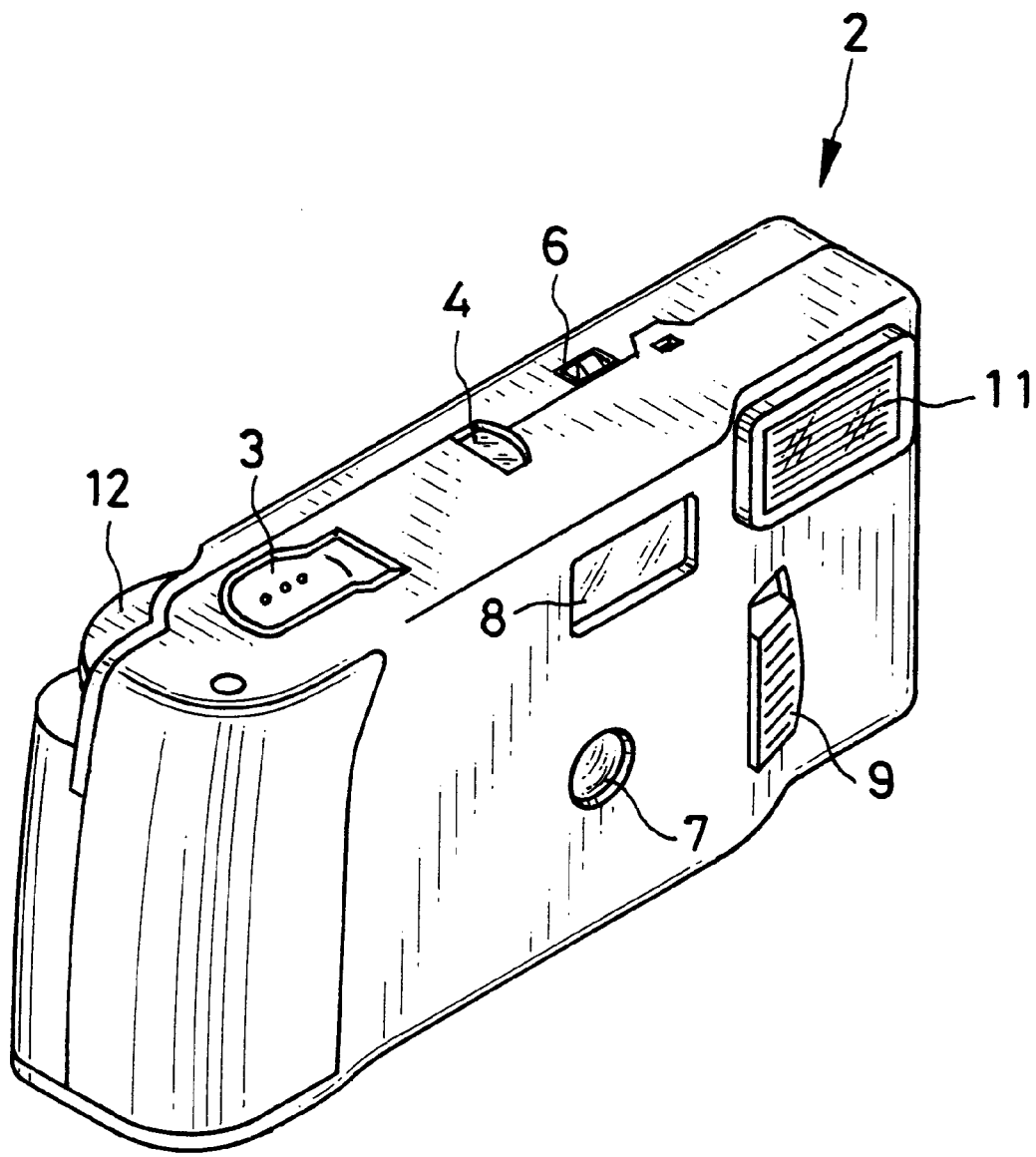
FIG. 1 is a perspective illustrating a lens-fitted photo film unit.

In FIG. 1, a lens-fitted photo film unit 2 of the invention includes a shutter release button 3, frame counter window 4 and charging completion indicator window 6, all disposed in an upper face of the lens-fitted photo film unit 2. A front face of the lens-fitted photo film unit 2 is provided with a taking lens 7, viewfinder objective window 8, charger button 9, and flash emitter 11. There is a winder wheel 12 partially uncovered in a rear face of the lens-fitted photo film unit 2. Also, a viewfinder eyepiece window is formed in the rear face.

In the lens-fitted photo film unit 2, the taking lens 7 has a focal length of 24 mm that is a standard value, and a lens speed of f/10. An aperture stop of an exposure light path is fixed. The charger button 9 is slidable in the vertical direction, and is turned on and off for charging and not charging the flash unit.

Figure 2:
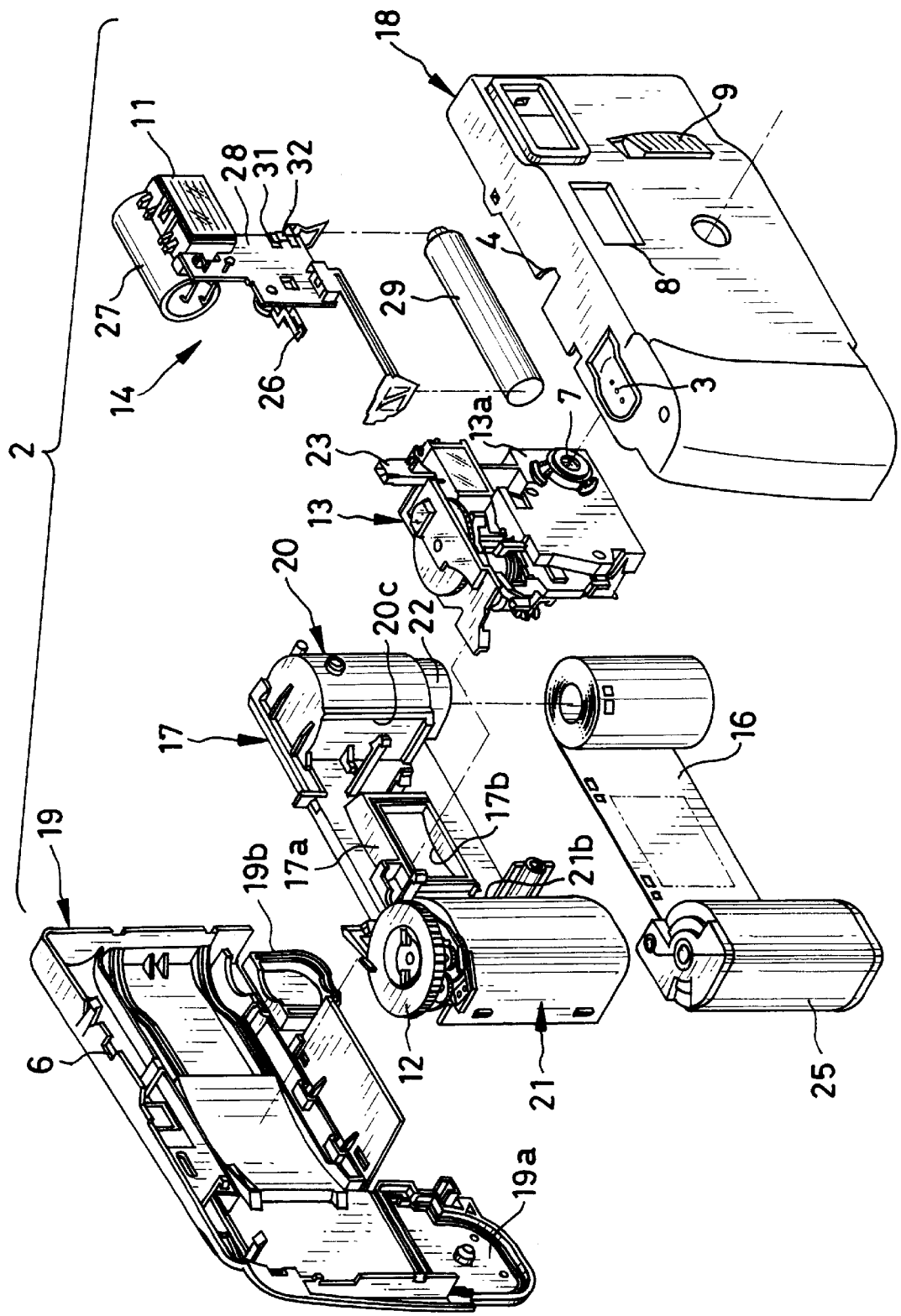
FIG. 2 is an exploded perspective illustrating the lens-fitted photo film unit.

In FIG. 2, the lens-fitted photo film unit 2 is constituted by a main body 17, and a front cover 18 and rear cover 19 for covering the front and rear of the main body 17.

An exposure tunnel portion 17a is included in the center of the main body 17. Ends of the exposure tunnel portion 17a have respectively a cassette holder chamber 21 and roll holder chamber 20. The cassette holder chamber 21 contains a cassette shell 25 of a photo film cassette. The roll holder chamber 20 contains a roll of photo film 16 that is drawn from the cassette shell 25 and wound in a roll form. An exposure unit 13 is secured to the front of the exposure tunnel portion 17a, and includes a shutter mechanism and taking lens which cooperate for taking an exposure. A base portion 13a of the exposure unit 13 constitutes a front portion of an exposure tunnel including the exposure tunnel portion 17a. An electronic flash unit 14 is secured to the main body 17 beside the exposure unit 13.

The photo film 16 is extended between the cassette holder chamber 21 and roll holder chamber 20, and transported by rotation of the winder wheel 12. In the middle of the main body 17, an exposure aperture 17b is formed. Behind the main body 17, a frame 16a or exposure region is created in the photo film 16 by the exposure aperture 17b.

Figure 3:
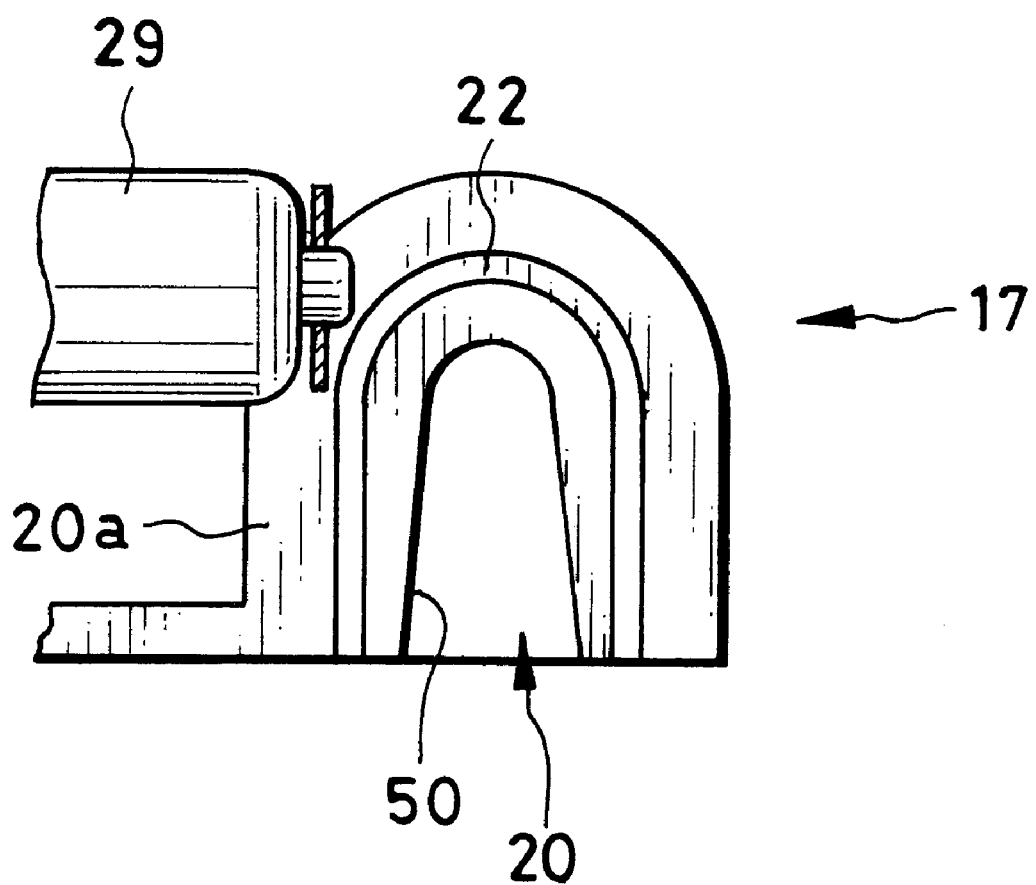
FIG. 3 is an explanatory view in a bottom plan, illustrating a roll holder chamber with a battery in the lens-fitted photo film unit.

In FIG. 3, a skirt projection portion 22 is formed with a lower edge of the roll holder chamber 20, is disposed about a lower opening 50 of the roll holder chamber 20, and receives a lower lid 19b. A portion of a battery 29 is disposed under the roll holder chamber 20. The skirt projection portion 22 can have a shape partially cut, and can have an outer recess or through hole for disposition of the battery 29. Furthermore, the skirt projection portion 22 may have a conventional shape without being cut.

Note that a lower lid 19a is provided to close a lower opening of the cassette holder chamber 21.

The photo film 16 has a photo film speed of ISO 1600 or higher. Even when the light amount is small or the shutter speed is high, sufficient exposure value can be obtained by the use of the high-speed photo film 16. In other words, a light amount of the flash unit can be substantially ¼ as high in the use of the photo film of ISO 1600 as in the use of the photo film of ISO 400.

In the exposure unit 13, there are a viewfinder, a frame counter mechanism and the shutter mechanism in the top of the base portion 13a. Also, a light guide member 23 is provided in the top of the base portion 13a for indicating a state of completing a charging operation of the flash device. A shutter cover 24 accommodates the taking lens 7, and covers a front of the base portion 13a. Also, a shutter blade that is not shown is disposed at an inner face of the shutter cover 24. The shutter blade is a knocking type so called in the field of lens-fitted photo film unit, and operates to open/close at a fixed shutter speed as predetermined.

The flash unit 14 is constituted by a flash circuit board 28 and the flash emitter 11. The flash circuit board 28 has a printed circuit pattern, and includes electrical elements such as a sync switch 26 and main capacitor 27. The flash emitter 11 includes a flash discharge tube and reflector. The battery 29 supplies the flash unit 14 with power. The sync switch 26 switches on and off in response to opening/closing of the shutter blade. When the charging is completed, flash light is emitted upon operation of the sync switch 26.

The flash circuit board 28 has a pair of contact segments 31 and a switch segment 32, which has one end connected with one of the contact segments 31. When the charger button 9 is slid, a remaining one of the contact segments 31 comes in contact with a portion of the switch segment 32, to short-circuit the contact segments 31 with one another. The flash circuit is closed to start charging the main capacitor 27. In the rear of the flash circuit board 28, a light-emitting diode (LED) or other illuminating structures is provided for the purpose of informing a user of completion of the charging operation.

The main capacitor 27 is a small type, and has a capacitance of approximately 30 μF. As the capacitance is so small, a length of the main capacitor 27 is reduced in comparison with that according to known lens-fitted photo film units. In combination with the main capacitor 27, the battery 29 is a UM-4 type that is small. The UM-4 type of the battery 29 has a smaller length than that of the UM-3 type, but has approximately ⅔ as great a diameter as that of the UM-3 type.

Figure 4:
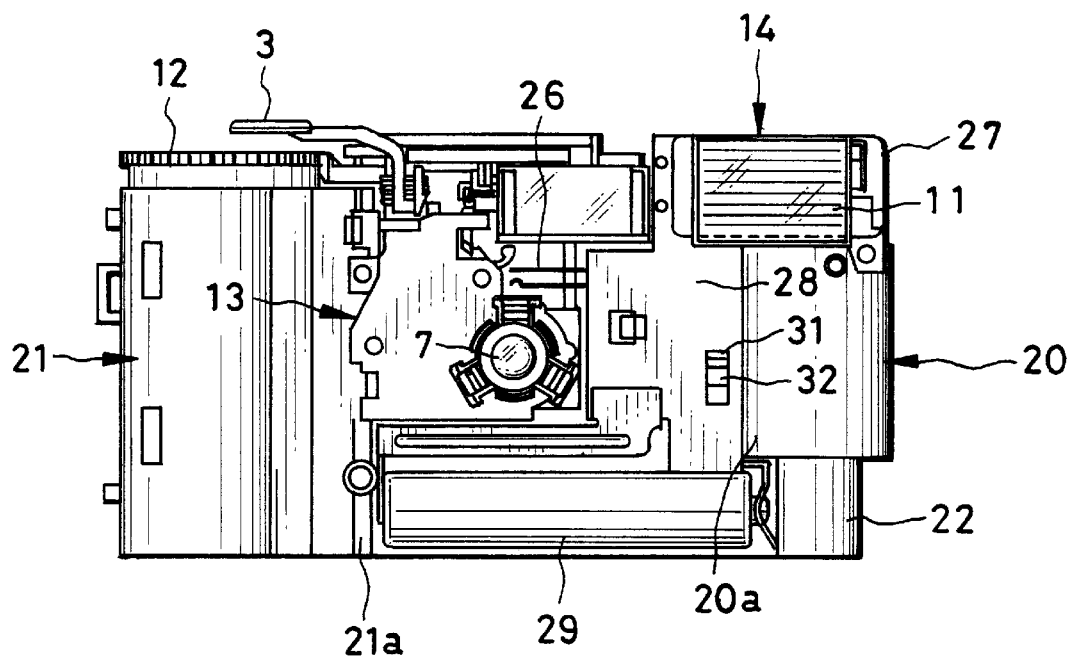
FIG. 4 is a front elevation illustrating a main body, an exposure unit and the battery.

In FIG. 4, the flash emitter 11 and main capacitor 27 are disposed at the top of the roll holder chamber 20. The main capacitor 27 is oriented horizontally to keep small a vertical size of the lens-fitted photo film unit 2. As the main capacitor 27 has a small size, the cassette holder chamber 21 and roll holder chamber 20 are so disposed that the shortest distance between their outer walls 20a and 21a is shorter than a length of the battery 29 in the horizontal direction.

The battery 29 is disposed to extend from a lower edge of the exposure unit 13 to a lower edge of the roll holder chamber 20. A portion of the battery 29 protrudes into a cutout defined by an edge of the skirt projection portion 22. As the battery 29 has a small diameter, a vertical size of the lens-fitted photo film unit 2 is not increased even with the disposition of the battery 29 under the roll holder chamber 20. Furthermore, a horizontal size of the lens-fitted photo film unit 2 is smaller than that according to the prior art, because the disposition of the battery 29 causes reduction of a horizontal size of the main body 17.

The operation of the above construction is described now. To take an exposure, a user rotates the winder wheel 12 to set a frame in the photo film. For an exposure with flash, the charger button 9 is slid to start charging the flash unit. As the main capacitor 27 has the small capacitance, the main capacitor 27 can be fully charged only after a short time.

The user checks the completion of the charging, frames a photographic field, and then depresses the shutter release button 3. The shutter blade is open and closed. The sync switch 26 is turned on to emit flash. As the main capacitor 27 has the small capacitance, the amount of the flash light is small. Object light of a photographic object incident upon the photo film 16 is small. However, the photo film 16 is high-speed photo film. Sufficient exposure value can be obtained, to create an object image with an adequate exposure.

In the present embodiment, the battery 29 may be any type having a smaller diameter than that of the UM-3 type. For example, the battery 29 may be the UM-5 type.

In the present embodiment, a rim portion of the lower lid 19b tightly contacts a peripheral surface of the skirt projection portion 22 to close the lower opening 50 reliably. It is possible that an outer recess or through hole may be formed in the rim portion of the lower lid 19b for receiving the end of the battery 29 that is located under the roll holder chamber 20.

In the present embodiment, the battery 29 is partially located under the roll holder chamber 20. It is possible that only an end of the battery 29 is overlapped on a lower end of the outer wall 20a of the roll holder chamber 20. The battery 29 may not extend to a position directly under a space inside the roll holder chamber 20.

Furthermore, it is possible that an alternative lower lid may be fitted on an inner face of the skirt projection portion 22. Such a lower lid may have a plate shape without a rim portion. Of course, the skirt projection portion 22 may have an outer recess or through hole to receive the end of the battery 29.

Figure 5:
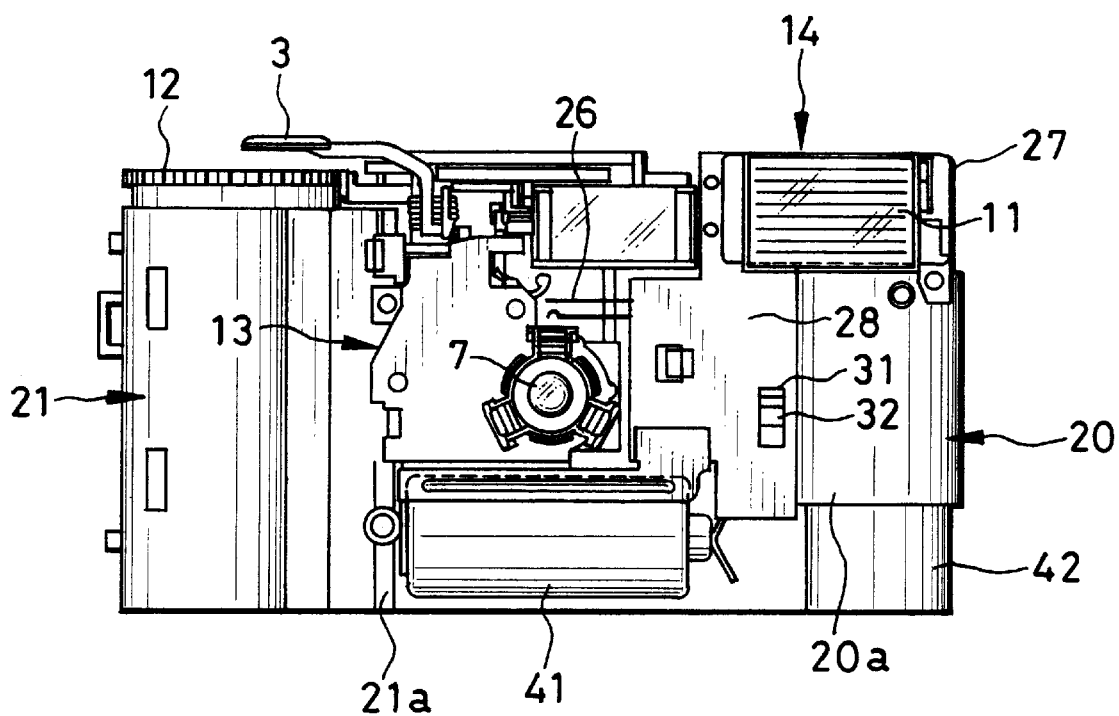
FIG. 5 is a front elevation illustrating a main body, an exposure unit and a battery in another preferred lens-fitted photo film unit.

In contrast with the above embodiment with the UM-4 type of the battery 29, another preferred embodiment in FIG. 5 is described now. In a lens-fitted photo film unit, a battery 41 is contained, and has a specially produced type which has a diameter equal to that of a UM-3 type but is approximately ⅔ as long as the UM-3 type. The battery 41 is disposed to extend between the cassette holder chamber 21 and roll holder chamber 20. As the length of the battery 41 is determined small, a distance between the cassette holder chamber 21 and roll holder chamber 20 can be reduced. It is to be noted that a preferred lens-fitted photo film unit may include a battery which may have a diameter equal to that of a UM-3 type but is approximately ½ as long as th UM-3 type.

Furthermore, a battery in a preferred lens-fitted photo film unit may have a length smaller than ½ of the length of the UM-3 type, or may have a length more than ½ and smaller than ⅔ of the length of the UM-3 type, for example may be ⅗ as long as the UM-3 type.

In the embodiment of FIG. 5, a skirt projection portion 42 is formed with the lower edge of the roll holder chamber 20, and receives the lower lid 19b. Alternatively, the outer wall of the roll holder chamber 20 may be extended down to a level the same as a lower edge of the cassette holder chamber 21.

Various modifications can be applied to the embodiments. Although the capacitance of the main capacitor 27 is approximately 30 $\mu$F, it is possible to use the main capacitor 27 with capacitance of at most approximately 50 $\mu$F. If the photo film has as high speed as ISO 3200, the main capacitor 27 can have capacitance of at least approximately 15 $\mu$F. Accordingly, the size of the lens-fitted photo film unit 2 can be reduced in a further manner.

In the above embodiments, the taking lens 7 has the speed of f/10. However, the taking lens 7 can have a speed of f/8. In other words, the taking lens 7 can have a higher light-transmitting power. Accordingly, an exposure value of exposures taken in the lens-fitted photo film unit can be higher. The occurs no shortage in the amount of light.

It is advantageous to use the taking lens 7 with a high speed in combination with the shutter device having a higher shutter speed, because the lens-fitted photo film unit is effective in avoiding influence of a camera shake with a user's hand and also keeping a sufficient amount of light. As the entirety of the lens-fitted photo film unit is typically small, it is rather hard for users to grasp the lens-fitted photo film unit very stably. The structure in consideration of a camera shake is effective in association with the reduction in the size.

It is also to be noted that the battery 29, 41 in the lens-fitted photo film unit of the present invention may be a manganese dry battery and also an alkaline battery.

Although the present invention has been fully described by way of the preferred embodiments thereof with reference to the accompanying drawings, various changes and modifications will be apparent to those having skill in this field.

Therefore, unless otherwise these changes and modifications depart from the scope of the present invention, they should be construed as included therein.

What is claimed is:

1. A lens-fitted photo film unit preloaded with unexposed photo film, comprising:

a main body, having a cassette holder chamber and a roll holder chamber, said cassette holder chamber containing a cassette shell, said roll holder chamber containing a roll of said photo film drawn from said cassette shell, said roll holder chamber comprising a lower wall adapted to support the roll of photo film, a lower opening arranged in the lower wall, and a skirt projection portion extending away from the lower wall toward a bottom of the photo film unit and surrounding the lower opening, the skirt projection portion being arranged inside of a periphery of the lower wall;

an exposure unit disposed between said cassette holder chamber and said roll holder chamber, for providing an exposure in said photo film;

an electronic flash unit, secured to said main body, for illuminating a photographic field to be photographed; and a battery for supplying said flash unit with power, said battery being disposed under said exposure unit, and having one end portion extended to a position under said roll holder chamber;

wherein the skirt projection portion comprises an outer recess, and wherein the battery is arranged so that the one end portion of the battery penetrates the recess.

2. A lens-fitted photo film unit as defined in claim 1, wherein a lower edge of said roll holder chamber is disposed higher than a lower edge of said cassette holder chamber, and said battery is disposed horizontally in a lengthwise direction thereof.

3. A lens-fitted photo film unit as defined in claim 2, wherein said cassette holder chamber has a first outer wall, said roll holder chamber has a second outer wall, and a distance between said first and second outer walls is shorter than a length of said battery.

4. A lens-fitted photo film unit as defined in claim 3, wherein said battery has a cylindrical shape, and has a diameter smaller than a diameter of a UM-3 battery.

5. A lens-fitted photo film unit as defined in claim 4, wherein said battery is a UM-4 type.

6. A lens-fitted photo film unit as defined in claim 2, wherein said flash unit includes:
 a flash emitter for applying flash light to said photographic field;
 a main capacitor for storing charge for flash emitting operation of said flash emitter, said main capacitor being disposed above said roll holder chamber, and having capacitance of 15–50 $\mu$F.

7. A lens-fitted photo film unit as defined in claim 6, wherein said photo film has photo film speed of ISO 1600 or higher.

8. A lens-fitted photo film unit preloaded with unexposed photo film, comprising:
 a main body, having a cassette holder chamber and a roll holder chamber, said cassette holder chamber containing a cassette shell, said roll holder chamber containing a roll of said photo film drawn from said cassette shell, said roll holder chamber comprising a lower wall adapted to support the roll of photo film, a lower opening arranged in the lower wall, and a skirt projection portion extending away from the lower wall toward a bottom of the photo film unit and surrounding the lower opening, the skirt projection portion being arranged inside of a periphery of the lower wall;
 an exposure unit disposed between said cassette holder chamber and said roll holder chamber, for providing an exposure in said photo film;
 an electronic flash unit, secured to said main body, for illuminating a photographic field to be photographed; and
 a battery, disposed under said exposure unit, for supplying said flash unit with power, said battery having a length equal to or less than substantially ⅔ of a length of a UM-3 battery in a lengthwise direction thereof;
 wherein the skirt projection portion comprises an outer recess, and wherein the battery is arranged so that the one end portion of the battery penetrates the recess.

9. A lens-fitted photo film unit as defined in claim 8, wherein said battery has a cylindrical shape, has a diameter substantially equal to a diameter of a UM-3 battery, and is disposed horizontally between said cassette holder chamber and said roll holder chamber.

10. A lens-fitted photo film unit as defined in claim 9, wherein said flash unit includes:
 a flash emitter for applying flash light to said photographic field;
 a main capacitor for storing charge for flash emitting operation of said flash emitter, said main capacitor being disposed above said roll holder chamber, and having capacitance of 15–50 $\mu$F.

11. A lens-fitted photo film unit as defined in claim 10, wherein said length of said battery is equal to or more than substantially ½ of said length of said UM-3 battery.

12. A lens-fitted photo film unit as defined in claim 11, wherein said photo film has photo film speed of ISO 1600 or higher.

13. A lens-fitted photo film unit preloaded with unexposed photo film, comprising:
 a main body, having a cassette holder chamber and a roll holder chamber, said cassette holder chamber containing a cassette shell, said roll holder chamber containing a roll of said photo film drawn from said cassette shell, said roll holder chamber comprising a lower wall adapted to support the roll of photo film, a lower opening arranged in the lower wall, and a skirt projection portion extending away from the lower wall toward a bottom of the photo film unit and surrounding the lower opening, the skirt projection portion being arranged inside of a periphery of the lower wall;
 an exposure unit, secured to said main body between said cassette holder chamber and said roll holder chamber, for providing an exposure in said photo film;
 an electronic flash unit, secured to said main body, for illuminating a photographic field to be photographed; and
 a battery for supplying said flash unit with power, said battery being disposed under said exposure unit, and having one end portion extended to a position under said roll holder chamber;
 wherein the skirt projection portion comprises a through hole, and wherein the battery is arranged so that the one end portion of the battery passes through the through hole.

14. A lens-fitted photo film unit preloaded with unexposed photo film, comprising:
 a main body, having a cassette holder chamber and a roll holder chamber, said cassette holder chamber containing a cassette shell, said roll holder chamber containing a roll of said photo film drawn from said cassette shell, said roll holder chamber comprising a lower wall adapted to support the roll of photo film, a lower opening arranged in the lower wall, and a skirt projection portion extending away from the lower wall toward a bottom of the photo film unit and surrounding the lower opening, the skirt projection portion being arranged inside of a periphery of the lower wall;
 an exposure unit, secured to said main body between said cassette holder chamber and said roll holder chamber, for providing an exposure in said photo film;
 an electronic flash unit, secured to said main body, for illuminating a photographic field to be photographed; and
 a battery, disposed under said exposure unit, for supplying said flash unit with power, said battery having a length equal to or less than substantially ⅔ of a length of a UM-3 battery in a lengthwise direction thereof;
 wherein the skirt projection portion comprises a through hole, and wherein the battery is arranged so that the one end portion of the battery passes through the through hole.

* * * * *